United States Patent [15] 3,638,125
Goell [45] Jan. 25, 1972

[54] APPARATUS AND METHOD FOR THE SYNCHRONOUS DETECTION OF A DIFFERENTIALLY PHASE MODULATED SIGNAL

[72] Inventor: James E. Goell, Middletown, N.J.

[73] Assignee: Bell Telephone Laboratories, Incorporated, Murray Hill, N.J.

[22] Filed: Nov. 26, 1969

[21] Appl. No.: 879,992

[52] U.S. Cl. ................................ 325/320, 178/67, 325/346, 325/351, 325/419, 325/444, 329/104, 329/122, 329/124

[51] Int. Cl. ................................ H04b 1/30

[58] Field of Search ................................ 178/66, 88, 5.4 SD, 67; 325/320, 419, 344, 30, 444, 47, 60, 346, 351, 49, 329; 329/104, 122, 123, 124; 179/15 BC; 328/134

[56] References Cited

UNITED STATES PATENTS 3,289,082 11/1966 Shumate ................................ 178/88

*Primary Examiner*—Robert L. Griffin
*Assistant Examiner*—Albert J. Mayer
*Attorney*—R. J. Guenther and Arthur J. Torsiglieri

[57] ABSTRACT

In a synchronous detector the carrier of a binary differentially coherent phase shift-keyed signal is recovered by decomposing the carrier information signal into its conjugate in-phase and out-of-phase components which contain in their arguments a term $\delta(t)$ representing the phase difference between the carrier and a local oscillator signal. The conjugate components are multiplied to generate a product signal which is sampled every other time slot to produce an error signal proportional to $\sin[2\delta(t)]$. This signal is applied to the local oscillator to phase lock the local oscillator signal to the carrier of the information signal.

18 Claims, 7 Drawing Figures

INVENTOR
J. E. GOELL
BY
A. J. Torsiglieri
ATTORNEY

APPARATUS AND METHOD FOR THE SYNCHRONOUS DETECTION OF A DIFFERENTIALLY PHASE MODULATED SIGNAL

BACKGROUND OF THE INVENTION

This invention relates to differential phase modulated (DPM) communications systems and, more particularly, to carrier recovery apparatus and methods for use in the detection of frequency-modulated binary differentially coherent phase shift-keyed (FM–BDCPSK) signals.

The state of the art in communications systems employing frequency shift keying (FSK) is typified by U.S. Pat. Nos. 3,032,611 of G. F. Montgomery, 3,117,305 of B. Goldberg, and 3,392,337 of A. Newburger. These systems are generally characterized by the use of two different frequency signals to identify respectively the space and mark (i.e., the one and zero) of a binary encoded signal. In such a system, the signal frequency is constant throughout any particular time interval, but may vary from interval to interval, depending on the information being transmitted.

By way of contrast, this invention relates to a pulse code modulation communication system of the type disclosed in application, Ser. No. 568,893 of W. D. Warters, filed on July 29, 1966, now U.S. Pat. No. 3,492,576 issued on Jan. 27, 1970, and assigned to applicant's assignee, wherein a pulse encoded signal is used to frequency modulate a high-frequency oscillator above and below a reference frequency. The signal frequency is not constant throughout any particular time interval but rather varies each and and every time interval. In a binary system (FM–BDCPSK) the phase shift produced by the modulation is equal to $\pm\pi/2$ radians when integrated over one time slot. In higher order DPM systems, e.g., $n$th order, the phase shift produced would be an integral multiple of $\pm\pi/n$, for optimum noise immunity. In a quaternary system, for example, the phase shift is either $\pm\pi/4$ or $\pm3\pi/4$ as described in my copending application, J. E. Goell Case 3, Ser. No. 659,203, filed on Aug. 8, 1967, now U.S. Pat. No. 3,519,936 issued on July 7, 1970, and assigned to the assignee hereof.

In all DPM systems the differential phase shift between pairs of pulses (i.e., coherent AC current pulses) in adjacent time slots is detected to recover the original binary information. Furthermore, in the FM–BDCPSK systems there is phase coherency among all RF pulses insured by the use of a single oscillator which, as mentioned previously, is frequency modulated above or below a reference frequency. In the prior art on the other hand (e.g., Goldberg) there is no phase coherency since the two oscillators utilized are totally independent of one another. Nor is there phase coherency between successive RF pulses produced by the same oscillator. Consequently, all DPM systems include differential phase detectors which do not detect the frequency of the signal in each time slot (which frequency is varying continuously), as the detectors of prior art FSK systems do, but rather detect the relative phase shift between pairs of pulses in adjacent time slots, i.e., the detector output is proportional to the integral of the signal frequency taken over one time slot.

One system for the detection and equalization of carrier information signals having arbitrary modulation (including differential phase modulation) and arbitrary distortion is disclosed in my copending application, J. E. Goell Case 6, Ser. No. 882,899, filed on Dec. 8, 1969, and assigned to the assignee hereof. In that system a synchronous local oscillator, i.e., a local oscillator phase locked to the carrier, is required to drive a pair of homodynes which demodulate the carrier information signal and down convert it to baseband. One technique for generating the synchronous local oscillator is to recover the carrier from the original information signal and use it to drive the homodynes.

It is a broad object of this invention to synchronously detect a differentially phase modulated signal.

It is another object of the present invention to generate a synchronous local oscillator signal for the detection of differentially phase modulated signals.

It is another object of this invention to generate a synchronous local oscillator signal for the detection of binary differentially coherent phase shift-keyed signals.

It is still another object of this invention to generate such a synchronous local oscillator signal from the carrier signal itself.

It is yet another object of this invention to phase lock the local oscillator signal to the carrier by means of an error signal proportional to the phase difference between the two.

SUMMARY OF THE INVENTION

These and other objects are accomplished in an illustrative embodiment of the invention by decomposing an FM–BDCPSK carrier information signal into its conjugate in-phase and out-of-phase components by means of a local oscillator signal which drives a pair of homodynes. The local oscillator is matched in frequency to the carrier but, without more, would differ in phase by an amount $\delta(t)$ since the conjugate components contain in their arguments a term proportional to $\delta(t)$. By multiplying these components together and then sampling the product signal every other in-phase time slot, an error signal proportional to $\sin[2\delta(t)]$ is generated. This error signal, after suitable filtering and amplification, is applied to the local oscillator (e.g., a voltage controlled oscillator) to bring the local oscillator signal arbitrarily close in phase to the carrier signal (e.g., to phase lock the local oscillator and the carrier).

The resulting phase-locked local oscillator may be used as a reference signal for retransmission and, in addition, the conjugate components may be recombined to produce the differentially phase-detected signal.

BRIEF DESCRIPTION OF THE DRAWING

The objects of the invention, together with its various features and advantages, can be easily understood from the following more detailed description taken in conjunction with the accompanying drawing, in which.

DETAILED DESCRIPTION

Figure 1A:
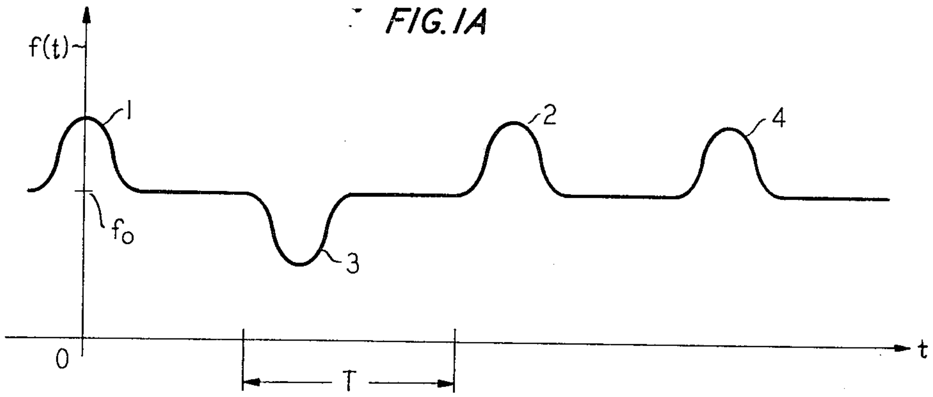
FIG. 1A is a graph of an illustrative variation in time of the frequency of the carrier of an FM–BDCPSK signal.

The aforementioned application of W. D. Warters teaches that substantial advantages can be realized in the implementation and operation of differential phase modulated communication systems by the utilization of frequency modulation techniques to produce the differential phase modulated signal (FM–DPM). That is, the information, at baseband, is first made to be contained in the choice of pulse polarity, and is then used to cause the frequency of a signal oscillator to deviate above and below its normal unmodulated frequency. The resulting phase shift can be computed by integrating the frequency excursion over each of the time intervals. Since in a binary system (e.g., FM–BDCPSK) optimum noise immunity is obtained when the two possible signal states are anticorrelated, that is, when the two possible values of phase shift differ by 180°, a modulator for use in a binary system is advantageously adjusted such that $$2\pi\int_T (f_+-f_0)\,dt+2\pi\int_T (f_0-f_-)\,dt=\pi \qquad (1)$$

where $T$ is the duration of each time interval;

$f_0$ is the unmodulated signal oscillator frequency;

$f_+$ is the instantaneous frequency of the signal oscillator when caused to increase above its unmodulated frequency by the baseband binary signal;

and, $f_-$ is the instantaneous frequency of the signal oscillator when caused to decrease below its unmodulated frequency by the baseband binary signal.

An FM–BDCPSK system offers advantages of efficiency and simplicity. For example, conversion from polar binary baseband to a differential phase modulated carrier signal is performed directly by frequency modulating a voltage controlled oscillator. In addition, the FM nature of the signal allows phase-locked oscillators to be used for gain and limiting.

As is known, a frequency varying signal $f(t)$ undergoes a phase shift $\Delta\phi$ relative to a reference signal, at frequency $f_o$, that is given by $$\Delta\varphi=2\pi\int_{\Delta t}[f(t)-f_0]dt \quad (2)$$

where the integration is over the time interval $\Delta t$. In an FM–BDCPSK system $\Delta t$ would be equal to $T$, the bit interval. To attain the aforementioned optimum noise immunity, the system is adjusted such that the magnitudes of the integrated frequency deviations in the positive and negative directions sum to $\pi$. That is $$\Delta\phi_+ + \Delta\phi_- = \pi \quad (3)$$

where $$\Delta\varphi_+ = 2\pi\int_T [f_+ - f_0]dt \quad (4)$$

and $$\Delta\varphi_- = 2\pi\int_T [f_0 - f_-]dt \quad (5)$$

In an FM–BDCPSK system typically $\Delta\phi_+=\pi/2$ and $\Delta\phi_-=\pi/2$, although some other, unequal division of the total phase shift is possible.

Figure 1B:
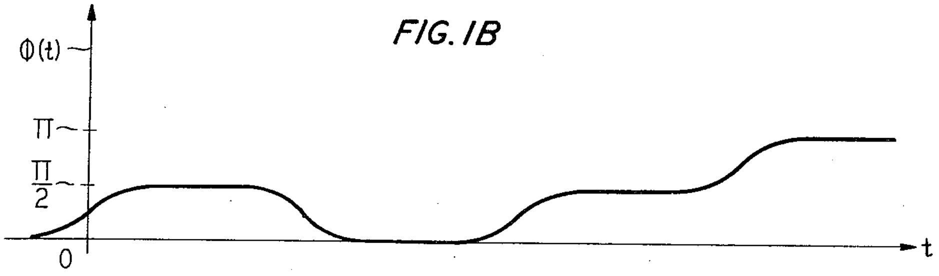
FIG. 1B is a graph of the phase of the carrier as a function of time corresponding to the frequency variation of FIG. 1A.

Turning then to the figures, the variation in frequency with time (i.e., the frequency modulation) of an FM–BDCPSK carrier of undeviated frequency $f_c$ is shown in FIG. 1A. In the first, third, and fourth time slots, the instantaneous frequency deviation $f(\phi t)$ is shown by curves 1, 2, and 4, respectively, to increase the frequency above that of the carrier. In the second time slot the curve 3 indicates the instantaneous frequency is less than that of the carrier. In each time slot, however, the total phase shift is either $\pm\pi/2$. That is, the area under the $f(t)$ represented by the integral $$\varphi(t) = \int_T f(t)dt,$$

produces a phase shift as shown in FIG. 1B.

In the first time slot, therefore, $\phi(t)$ increases to a maximum of $\pi/2$ after a time $T/2$ and remains constant until $t=T$. The "negative" frequency duration in the second time slot reduces $\phi(t)$ to zero by the time $t=3T/2$. Similarly, during the third and fourth time slots $\phi(t)$ increases first to $\pi/2$ and then $\pi$.

Figure 1C:
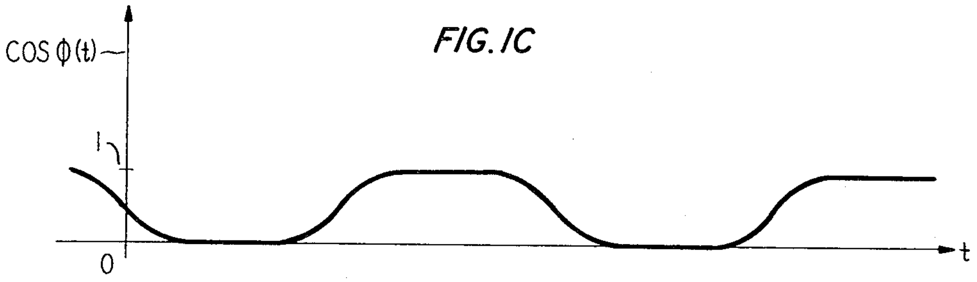
FIGS. 1C and 1D are graphs of the phase of the in-phase and out-of-phase components of the carrier signal defined by FIG. 1B.
Figure 1D:
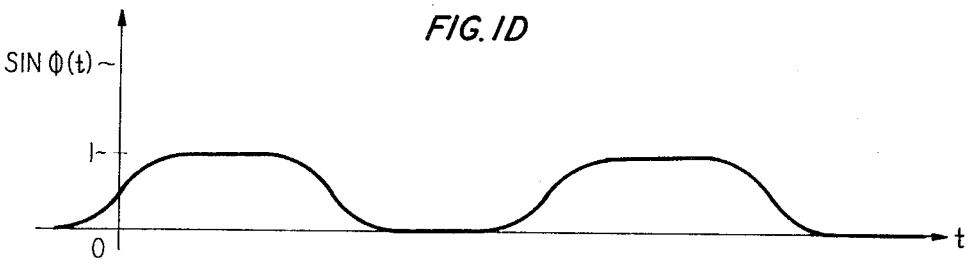
Figure 2:
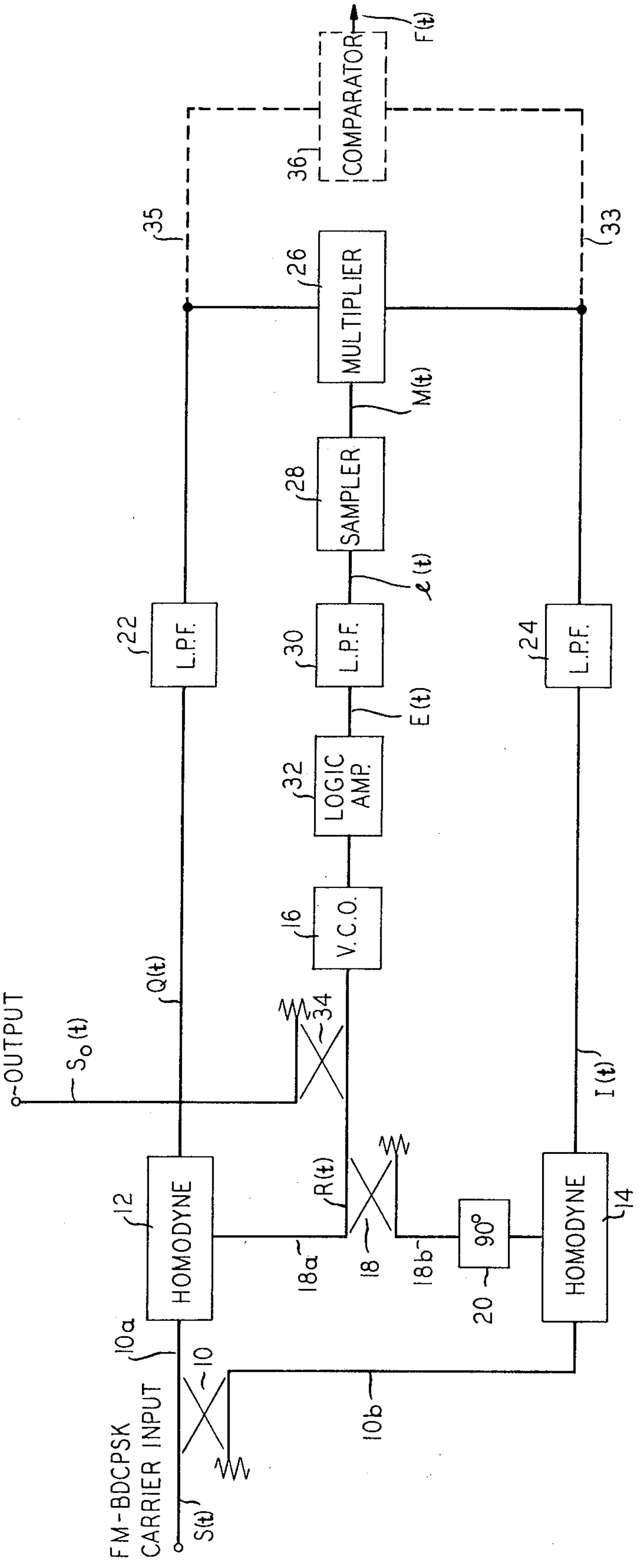
FIG. 2 is a schematic of a synchronous detector in accordance with an illustrative embodiment of the invention.

The in-phase and out-of-phase components of the FM–BDCPSK signal are represented by $\cos\phi(t)$ and $\sin\phi(t)$ and are shown respectively in FIGS. 1C and 1D. As will be described, hereinafter, these signals when sampled properly can be utilized to recover the carrier of an FM–BDCPSK information signal. Turning then to FIG. 2, in accordance with an illustrative embodiment of the synchronous detector of the invention, an FM–BDCPSK signal $S_i(t)$ is given by $$S_i(t)=V(t)\cos[\omega_o t+\phi(t)], \quad (6)$$

where $V(t)$ is the instantaneous amplitude of $S_i(t)$ and is usually a constant, $\omega_0$ is the angular carrier frequency and $\phi(t)$ represents the phase modulation of $S_i(t)$. This signal is applied to a resistively terminated hybrid coupler 10 (e.g., a 3 db. coupler) to produce substantially equal components thereof 90° out-of-phase with each other in transmission paths 10*a* and 10*b*. These components are then applied, respectively, to one of inputs of homodynes 12 and 14 which are typically well-known product demodulators. The other inputs to the homodynes are supplied by a local oscillator, represented by a known voltage controlled oscillator 16, which generates a signal $R(t)$ given by $$R(t)=\sin[\omega_o t+\delta(t)] \quad (7)$$

where $\delta(t)$ is the difference in phase between the local oscillator signal and the undeviated carrier of $S_i(t)$. This signal is divided into equal portions by resistively terminated hybrid coupler 18. One of the portions is passed through 90° phase shifter 20 so that the signals on paths 18*a* and 18*b* are in phase with each other and given by equation (7).

Homodyne 12 generates at its output an out-of-phase conjugate component $Q(t)$ of $S_i(t)$ given by $$Q(t=(V(t)/2)\sin[\delta(t)-\phi(t)] \quad (8)$$

and homodyne 14 similarly generates the corresponding in-phase conjugate component $T(t)$ given by $$I(t)=(v(t)/2)\cos[\delta(t)-\phi(t)]. \quad (9)$$

In order for homodynes to function properly in the demodulation process, it is essential that the local oscillator be phase locked with the carrier of the information signal, i.e., $\delta(t)$ should be as small as possible.

To accomplish this end each of outputs of homodynes 12 and 14 is filtered by means of low-pass filters 22 and 24, respectively, to remove unwanted demodulation products (e.g., signals of frequency $2\omega_o$) and then multiplied in multiplier 26 (e.g., a conventional diode multiplier) to generate product signal $M(t)$ given by $$M(t)\approx\tfrac{1}{4}\sin[2\delta(t)-2\phi(t)]. \quad (10)$$

Alternatively, the filters may be incorporated, and be made an integral part of the homodynes.

By sampling $M(t)$ every other in-phase time slot, when, as can be seen from FIG. 1C, $2\phi(t)=0$ or $2\pi$, an error signal $e(t)$ is produced which is proportional to the phase difference $\delta(t)$. Low-pass filter 30 passes only the envelope of the function $e(t)$ to yield the error signal $E(t)$ given by $$E(t)\approx\tfrac{1}{4}\sin[2\delta(t)]. \quad (11)$$

$E(t)$ is then applied to amplifier 32 in order to drive VCO 16. Thus, the output signal $S_o(t)$ of hybrid coupler 34 can be made arbitrarily close in phase to the input carrier information signal $S_i(t)$. The phase-locked signal $S_o(t)$ may be used, for example, as a reference signal for the retransmission of information.

Alternatively, sampling may be made to occur in each out-of-phase time slot (FIG. 1D) when $2\phi(t)=0$ or $2\pi$, in which case the local oscillator would be phase locked to the carrier but 90° out-of-phase therewith. Hence, merely phase shifting by 90° the resulting local oscillator produces the desired synchronous signal.

For the case of nonideal phase shift, that is, when the change in $2\Phi(t)$ is not always exactly equal to 0 or $2\pi$ over two time slots, a true carrier does not exist. Nevertheless, the carrier recovered by the circuit of the present invention will be adequate for detection as long as the phase difference taken over any two double baud intervals is close to 0 or $2\pi$.

It is understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention. In particular, this invention makes it readily feasible to employ homodyne detection in which the down conversion from RF to baseband is linear, thus permitting the use of a linear baseband equalizer. One such equalizer, disclosed in my copending application, J. E. Goell Case 6, Ser. No. 882,899, filed on Dec. 8, 1969, and assigned to the assignee hereof, does not require phase shifters and is readily adapted to the use of relatively simple dividing networks with amplifiers to provide isolation rather than the more complicated networks required for conventional RF transversal equalizers.

Such a baseband equalizer can readily be applied to the outputs of low-pass filters 22 and 24, i.e., the baseband conjugate in-phase and out-of-phase components of the FM–BDCPSK signal. A comparator 36 combines these components to reproduce at baseband the differentially phase-detected signal $F(t)$. In the comparator (or prior thereto) the components $Q(t)$ and $I(t)$ are interleaved in time. Then, the comparator, by means well known in the art, compares the sign of the differential phase shift in one time slot in channel 33 (the out-of-phase component) with the sign of the differential phase shift in the previous time slot in channel 33 (the in-phase component) and generates a positive output (i.e., $+\pi/2$) When the compared signs are the same and a negative output (i.e., $-\pi/2$) when the compared signs are different. It then also compares the sign in one time slot of channel 35 with the sign in the previous time slot of channel 33 and similarly generates either a positive or negative output, which follows in time the output from the first comparison. This process is then repeated until all the differential phase information is recovered.

Where, however, for design, economic or other reasons, equalization at RF is desired, my copending application, J. E. Goell Case 5, Ser. No. 868,034 filed on Oct. 21, 1969, and assigned to the assignee hereof, teaches methods and apparatus for carrier equalization without the need for phase shifters. Such an equalizer could readily be utilized at the front end of the circuit of FIG. 2, i.e., at carrier or RF frequencies prior to the decomposition of the information signal into its conjugate components.

What is claimed is:

1. In a frequency modulated binary differentially coherent phase shift-keyed communication system in which the instantaneous frequency of a carrier signal is modulated is successive time slots in accordance with information to be transmitted so that in each adjacent pair of time slots the total phase shift produced by the frequency modulation is approximately $\pi$ radians, a method for simultaneously detecting said modulated carrier signal comprising the steps of:
   mixing the output of a local oscillator with said modulated carrier signal to decompose said modulated carrier signal into conjugate baseband in-phase and out-of-phase components each having associated therewith time slots corresponding to the time slot of said modulated carrier signal,
   multiplying said components together to generate a product signal having associated therewith time slots corresponding to the time slots of said modulated carrier signal,
   sampling said product signal in every other time slot to generate an error signal proportional to $\delta(t)$, the difference in phase between the output of said local oscillator and the carrier signal, and
   applying said error signal to said local oscillator to phase-lock the output of said local oscillator to said carrier signal.

2. The method of claim 1 including the step of recombining said conjugate components to produce a differentially phase-detected form of said modulated carrier signal.

3. The method of claim 2 wherein said recombining step comprises comparing the sign of the differential phase shift in one time slot of one of said conjugate components with the differential phase shift in the previous time slot of the other of said components and generating a first positive output when said compared signs are the same and a first negative output when different, and then comparing said sign in one time slot of said other component with the said sign in the previous time slot of said one component and generating a second positive output when said signs are the same and a second negative output when different, said second output following in time said first output, and repeating said comparisons until all of the differential phase information is recovered.

4. A method of claim 1 including the step of utilizing said phase-locked local oscillator signal as a reference signal for the retransmission of information.

5. The method of claim 1 wherein said mixing step comprises the steps of:
   dividing said modulated carrier signal into separate signal portions 90° out-of-phase with one another,
   applying the output of said local oscillator and one of each of said signal portions to separate homodynes to generate at the output of one of said homodynes said in-phase component and at the output of said other homodyne said out-of-phase component.

6. The method of claim 5 including an additional step after said mixing step and before said multiplying step comprising filtering from the outputs of each of said homodynes unwanted demodulation products.

7. The method of claim 6 wherein said product signal of said multiplying step is approximately ¼ sin $[\delta(t)-\phi(t)]$, where $\phi(t)$ is the phase modulation of said modulated carrier signal, and wherein said sampling occurs when $2\phi(t)$ is equal to 0 or $2\pi$, or any multiple thereof, to produce an error signal of approximately ¼ sin $[2\delta(t)]$.

8. In a frequency-modulated binary differentially coherent phase shift-keyed communication system in which the instantaneous frequency of a carrier signal is modulated in successive time slots in accordance with information to be transmitted so that in each adjacent pair of time slots the total phase shift produced by the frequency modulation is approximately $\pi$ radians, apparatus for synchronously detecting said modulated carrier signal comprising
   a local oscillator signal source,
   means for combining said modulated carrier signal and the output of said local oscillator to decompose said modulated carrier signal into conjugate baseband in-phase and out-of-phase components each having associated therewith time slots corresponding to the time slots of said modulated carrier signal,
   means for multiplying said components together to generate a product signal having associated therewith time slots corresponding, to the time slots of said modulated carrier signal,
   means for sampling said product signal in every other time slot to generate an error signal, and
   means for applying said error signal to said local oscillator signal source to phase-lock the output of said source and said carrier signal.

9. The apparatus of claim 8 wherein said combining means comprises
   a first and second homodynes,
   means for applying a portion of said modulated carrier signal and said local oscillator signal to the inputs to said first homodyne to produce at its output said conjugate out-of-phase component,
   means for phase shifting by 90° the remaining portion of either said modulated carrier signal or said local oscillator signal, and
   means for applying said remaining portions of said phase-shifted signal and said other portion to the inputs of said second homodyne to produce at its output said conjugate in-phase component.

10. The apparatus of claim 9 wherein said applying means comprises
   first and second resistively terminated hybrid couplers, said modulated carrier signal being applied to said first coupler so as to produce a first separate portion of said signal and a second portion 90° out-of-phase therewith, said local oscillator signal being applied to said second coupler so as to produce a first separate portion of said signal and a second portion 90° out-of-phase therewith,
   means for phase shifting by 90° said second portion of said local oscillator signal,
   means for applying said first portions of each of said modulation carrier and local oscillator signals to said first homodyne to generate at its output said out-of-phase component, and
   means for applying said second portion of said information signal and said phase-shifted second portion of said local oscillator signal to said second homodyne to generate at its output said in-phase component.

11. The apparatus of claim 10 in combination with means located between each of said homodynes and said multiplying means for filtering out unwanted demodulation signal products.

12. The apparatus of claim 8 wherein said sampling means comprises means for sampling said product signal every other in-phase time slot when twice the phase $\phi(t)$ of said information signal is an integral multiple of 0 or $2\pi$.

13. The apparatus of claim 12 wherein said error signal is proportional to $\sin[2\delta(t)]$ and said product signal is proportional to $\sin[2\delta(t)-2\Phi(t)]$, where $\delta(t)$ is the difference in phase between said local oscillator signal and the undeviated carrier signal.

14. The apparatus of claim 8 wherein said sampling means comprises means for sampling said product signal every other out-of-phase time slot, and means for phase shifting by 90° the resultant phase-locked local oscillator signal.

15. The apparatus of claim 8 where said local oscillator signal source comprises a voltage controlled oscillator, said sampling means includes means for detecting the envelope of said sampled product signal to produce said error signal, means for amplifying said error signal, and means for applying said amplified error signal to the input of said voltage controlled oscillator.

16. The apparatus of claim 8 in combination with means for recombining said conjugate components to produce a differentially phase-detected version of said modulated carrier signal.

17. The apparatus of claim 16 wherein said recombining means comprises a comparator which compares the sign of the differential phase shift in one time slot of one of said conjugate components with the sign of the differential phase shift in the previous time slot of the other of said components and generates a first positive output when said compared signs are the same and a first negative output when different, and then compares said sign in one time slot of said other component with said sign in the previous time slot of said one component and generates a second positive output when said signs are the same and a second negative output when different, said second output following in time said first output, and said comparisons being repeated until all of the differential phase information is recovered.

18. The apparatus of claim 8 in combination with means for utilizing said phase-locked local oscillator signal as a reference signal for the retransmission of information.

* * * * *

UNITED STATES PATENT OFFICE
CERTIFICATE OF CORRECTION

Patent No. 3,638,125 Dated January 25, 1972

Inventor(s) James E. Goell

It is certified that error appears in the above-identified patent and that said Letters Patent are hereby corrected as shown below:

Column 2, line 27, after the first parenthesis delete "e.g." and insert --i.e.--.

Column 3, line 39, after "deviation" change "f(φt)" to --f(t)--.

Column 3, equation 6, change "$S_i(t) = V(t) \cos [\omega_o t + \Phi(t)]$" to --$S_i(t) = V(t) \cos [\omega_o t + \varphi(t)]$--.

Column 4, equation 8, change "$Q(t = (V(t)/2) \sin [\delta(t) - \Phi(t)]$" to --$Q(t) = V(t)/2 \sin [\delta(t) - \varphi(t)]$--.

Column 4, line 12, after "component" change "T(t)" to --I(t)--.

Column 4, equation 9, change "$I(t) = (v(t)/2) \cos [\delta(t) - \Phi(t)]$" to --$I(t) = V(t)/2 \cos [\delta(t) - \varphi(t)]$--.

Column 5, line 5, after "channel" change "33" to --35--.

Column 5, line 26, after "modulated" change "is" to --in--.

Column 5, line 6, after "(i.e., + π/2)" change "When" to --when--.

Signed and sealed this 26th day of September 1972.

(SEAL)
Attest:

EDWARD M.FLETCHER,JR.
Attesting Officer

ROBERT GOTTSCHALK
Commissioner of Patents